Patented May 22, 1945

2,376,340

UNITED STATES PATENT OFFICE 2,376,340

THIOETHERS DERIVED FROM POLYMERS OF CYCLOPENTADIENE

Herman A. Bruson and Thomas W. Riener, Philadelphia, Pa., assignors to The Resinous Products & Chemical Company, Philadelphia, Pa., a corporation of Delaware No Drawing. Application June 5, 1943, Serial No. 489,800

10 Claims. (Cl. 260—514)

This invention relates to addition products of mercaptans and polymers of cyclopentadiene having the formula:

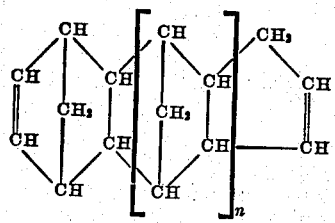

wherein $n$ is zero or a small integer, such as 1, 2, or 3.

It has been shown that monomeric cyclopentadiene, upon long standing with thiophenol, will add the thiophenol to both of its double bonds to form the corresponding saturated dithioether (A) in small yields:

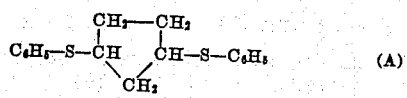

In contrast thereto, it is now found that polymers of cyclopentadiene containing two double bonds per molecule react with thiophenols as well as with other types of mercaptans to form unsaturated monothioethers with a simultaneous rearrangement of the original ring system to a new cyclic system which, for the sake of brevity, is herein referred to as the "norpolycyclopentadiene" ring system. This unexpected reaction occurs with the evolution of considerable heat and is practically quantitative. The reaction which occurs when a mercaptan adds to dicyclopentadiene, for example, may be formulated as follows:

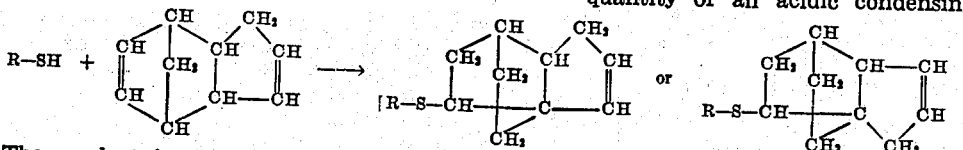

The product is a dihydronordicyclopentadienyl thioether represented by one of the probable isomeric formulas above.

In a similar manner, tricyclopentadiene yields the corresponding dihydronortricyclopentadienyl thioether as follows:

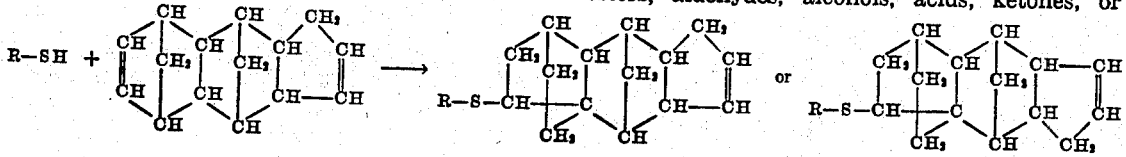

It is surprising that, in comparison with cyclopentadiene monomer, the reaction takes such a different course and is so selective as to leave the residual double bond entirely unaffected even when an excess of mercaptan is used.

The reactions herein described are applicable, insofar as can be determined, to mercaptans of widely different types. For example, the mercaptans may contain more than one —SH group, as in ethane dithiol, benzene dithiol, or the like. They may be primary, secondary, or tertiary in character, saturated or unsaturated, and may belong to the aliphatic, aromatic, arylaliphatic, cycloaliphatic, or heterocyclic series. They may contain other substituents, for example, hydroxy, alkoxy, aryloxy, carboxy, carbalkoxy, nitro, cyano, thiocyano, keto, sulfono, halogeno, or other inert groups in their molecule, or they may contain chains or cycles which are interrupted by —O— or —S— linkages.

Typical mercaptans which can be used are the following: Methyl, ethyl, hydroxyethyl, cyanoethyl, chloroethyl, allyl, methallyl, crotonyl, isopropyl, any of the primary, secondary, or tertiary butyl, amyl, hexyl, or octyl mercaptans, dodecyl, cetyl, oleyl, or octadecyl mercaptan, as well as phenyl, naphthyl, xenyl, benzyl, phenylethyl, cinnamyl, cyclohexyl, cyclopentyl, phenoxyethyl, benzyloxyethyl, p-chlorophenoxyethyl, methoxyethoxyethyl, phenoxyethoxyethyl, tetrahydrofurfuryl, or benzthiazyl mercaptan and homologues thereof.

In the case of certain mercaptans which possess only weakly acidic properties and are, therefore, sluggish in their reaction, the condensation can be strongly accelerated by adding a small quantity of an acidic condensing agent as a catalyst. There may be used, for example, sulfuric acid, sulfuric acid esters, such as ethyl sulfuric acid, organic sulfonic acids, such as toluene or butyl sulfonic acid, or boron trifluoride and its coordination complexes with water, esters, aldehydes, alcohols, acids, ketones, or ethers, such as BF₃·(H₂O)ₓ, where x is one or two, BF₃·C₄H₉OH, BF₃·2CH₃COOH, BF₃·2CH₃COOC₂H₅, BF₃·CH₃COCH₃, BF₃·O(C₂H₅)₂, or BF₃·C₄H₉OC₄H₉. In the presence of a boron trifluoride catalyst, the reactions are complete in a few hours.

Besides dicyclopentadiene or tricyclopentadiene, one may use tetracyclopentadiene or pentacyclopentadiene or mixtures thereof as suitable polymers for the reaction. The polycyclopentadiene may be pure or it may be a crude product.

The addition-rearrangement reaction involving a mercaptan and a polycyclopentadiene having two double bonds per molecule is readily carried out. The reaction may usually be initiated merely by mixing the two reactants. Even at temperatures of the order of 0° C., the reaction often begins spontaneously. In some cases, warming is necessary to start the reaction, while in a minority of cases where, as explained, the sulfhydryl group is very weak, addition of an acidic condensing agent may be desirable. It is generally desirable to control the reaction when it is once initiated by rate of addition, use of solvent, or cooling. In some cases, it may be helpful to complete the reaction by heating, but the temperatures used should not exceed those at which the polycyclopentadienes are cracked to simpler forms. Generally, the reaction range of 30° C. to 125° C. is most suitable. The reaction may be performed under normal, reduced, or increased pressure. When the reaction has been carried out, the products may be purified, if desired, by distillation, extraction, stripping, treatment with decolorizing clay or carbon, etc. If an acidic condensing agent has been used, it is desirable to remove it by washing, neutralization, or similar procedure.

The products obtained are intended for use as insecticides, fungicides, drug intermediates, antioxidants, rubber vulcanization accelerators, and as additives for improving petroleum lubricants.

The following examples illustrate the invention, the parts being by weight:

Example 1

To 26.4 parts of dicyclopentadiene, there was added 18.4 parts of mercapto acetic acid. A vigorous exothermic reaction occurred and the temperature rose rapidly to 90° C. At this point cooling was applied and, after the reaction had subsided, the mixture was heated for one hour longer at 90° C. to complete the reaction.

The product was then distilled in vacuo. The dihydronordicyclopentadienyl thioacetic acid having the empirical composition $$HOOC-CH_2-S-C_{10}H_{13}$$

distilled over at 190°–200° C./4 mm. as a thick yellow oil in a yield of thirty parts. Upon redistillation, it boiled at 182° C./2 mm. and crystallized on standing. After recrystallization from petroleum ether, it formed colorless crystals melting at 53°–54° C. having the probable formula:

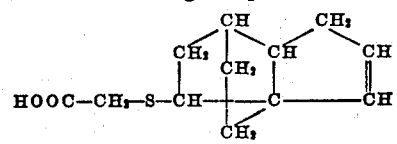

or

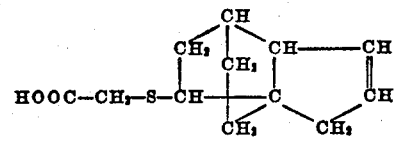

Example 2

Thiophenol (26 parts) was mixed with 31.2 parts of pure dicyclopentadiene in a flask fitted with a reflux condenser. The reaction was strongly exothermic, the temperature rising to 90° C. in a few minutes. At this point, cooling was applied and, when the reaction had moderated, it was completed by warming for two hours at 90° C.

The product was isolated by distillation in vacuo. The dihydronordicyclopentadienyl phenyl thioether distilled over at 170°–180° C./4–5 mm. in a yield of 53 parts. Upon redistillation, it boiled at 157° C./2 mm. It is a colorless liquid of characteristic odor, having the empirical composition of $C_6H_5-S-C_{10}H_{13}$ and the probable formula:

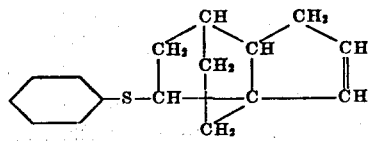

or

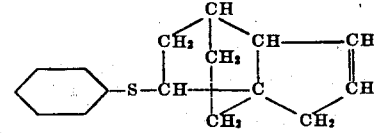

Example 3

Pure dicyclopentadiene (26 parts) was stirred with 35 parts of n-butoxyethoxyethyl mercaptan, $C_4H_9-O-CH_2CH_2-O-CH_2CH_2SH$. The temperature gradually rose spontaneously to 80° C., whereupon cooling was applied until the heat evolution ceased. The mixture was then warmed for two hours at 95° C. and the product isolated by distillation in vacuo.

The resulting product, having the formula $$C_4H_9-O-CH_2CH_2-O-CH_2CH_2-S-C_{10}H_{13}$$

(where $C_{10}H_{13}$ is the dihydronordicyclopentadienyl group), distilled over at 190°–195° C./2 mm. as a pale yellow oil in a yield of 48 parts. Upon redistillation, it boiled at 181°–183° C./1.5 mm. and formed an almost colorless liquid.

Example 4

One molecular equivalent of dicyclopentadiene was mixed with one molecular equivalent of benzyl mercaptan and, after the exothermal reaction had ceased, the mixture was heated three hours at 90°–95° C. Upon distillation, an almost quantitative yield of dihydronordicyclopentadienyl benzyl thioether, $C_6H_5-CH_2-SC_{10}H_{13}$, was obtained as a colorless oil boiling at 185°–190° C./3 mm.

Example 5

A mixture of 26.4 parts of dicyclopentadiene and 20.8 parts of amyl mercaptan (mixed amyl isomers) was warmed to 65° C. An exothermic reaction set in. When the reaction mixture reached 90° C., cooling was applied until the reaction subsided, after which the mixture was heated for two hours at 95° C.

Upon distillation in vacuo, the dihydronordicyclopentadienyl amyl thioether (mixed amyl isomers), $C_5H_{11}-S-C_{10}H_{13}$, distilled over at 135°–140° C./3 mm. as a colorless liquid in a yield of 37 parts.

Example 6

A mixture of 39.6 parts of tricyclopentadiene, 50 parts of benzene, and 18.4 parts of mercapto acetic acid was boiled under reflux for one and one-half hours and then distilled in vacuo.

The dihydronortricyclopentadienyl thioacetic acid, having the empirical composition

distilled over at 235°–240° C./2 mm. as a thick oil having the probable formula:

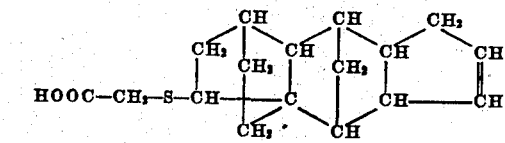

or

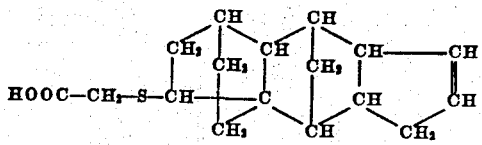

Upon recrystallization from nitromethane, it formed colorless crystals melting at 88°–89° C. Its copper salt is useful as a fungicide.

*Example 7*

A mixture of two molecular equivalents of dicyclopentadiene and one molecular equivalent of 1,2-dithiolethane in an equal weight of benzene was boiled under reflux for three hours and the benzene then evaporated off. The residual oil was distilled in vacuo.

The product boiling at 260° C./5 mm. was the di-(dihydronordicyclopentadienyl) ethylene dithioether, $C_{10}H_{13}$—S—$CH_2CH_2$—S—$C_{10}H_{13}$. It formed a reddish yellow oil.

We claim:

1. As a new compound, a dihydronorpolycyclopentadienyl thioether, the addition-rearrangement product of a crystalline polycyclopentadiene having one to four endomethylene cycles and two double bonds per molecule and an organic compound having at least one sulfhydryl group, the dihydronorpolycyclopentadienyl group of said thioether having a double bond in a terminal five-membered cycle, and having the thioether group joined to an endoethylene cyclopentano group as the opposite terminal cycle thereof.

2. As a new compound, a dihydronorpolycyclopentadienyl thioether of a mercaptan, the addition-rearrangement product of a crystalline polycyclopentadiene having one to four endomethylene cycles and two double bonds per molecule and a mercaptan, the dihydronorpolycyclopentadienyl group of said thioether having a double bond in a terminal five-membered cycle and having the thioether group joined to an endoethylene cyclopentano group as the opposite terminal cycle thereof.

3. As a new compound, a dihydronorpolycyclopentadienyl thioether of an aliphatic mercaptan, the addition-rearrangement product of a crystalline polycyclopentadiene having one to four endomethylene cycles and two double bonds per molecule and a mercaptan, the dihydronorpolycyclopentadienyl group of said thioether having a double bond in a terminal five-membered cycle and having the thioether group joined to an endoethylene cyclopentano group as the opposite terminal cycle thereof.

4. As a new compound, a dihydronorpolycyclopentadienyl thioether of mercapto acetic acid, the addition-rearrangement product of a crystalline polycyclopentadiene having one to four endomethylene cycles and two double bonds per molecule and mercapto acetic acid, the dihydronorpolycyclopentadienyl group of said thioether having a double bond in a terminal five-membered cycle and having the thioether group joined to an endoethylene cyclopentano group as the opposite terminal cycle thereof.

5. As a new compound, a dihydronordicyclopentadienyl thioether of a mercaptan, the addition-rearrangement product of crystalline dicyclopentadiene and a mercaptan, the dihydronordicyclopentadienyl group of said thioether having a double bond in a terminal five-membered cycle and having the thioether group joined to an endoethylene cyclopentano group as the opposite terminal cycle thereof.

6. As a new compound, a dihydronortricyclopentadienyl thioether of a mercaptan, the addition-rearrangement product of crystalline tricyclopentadiene having two endomethylene cycles and two double bonds per molecule and a mercaptan, the dihydronortricyclopentadienyl group of said thioether having a double bond in a terminal five-membered cycle and having the thioether group joined to an endoethylene cyclopentano group as the opposite terminal cycle thereof.

7. As a new compound, a dihydronordicyclopentadienyl thioether of mercapto acetic acid, the addition-rearrangement product of crystalline dicyclopentadiene and mercapto acetic acid, the dihydronordicyclopentadienyl group of said thioether having a double bond in a terminal five-membered cycle, and having the thioether group joined to an endoethylene cyclopentano group as the opposite terminal cycle thereof.

8. As a new compound, a dihydronortricyclopentadienyl thioether of mercapto acetic acid, the addition-rearrangement product of crystalline tricyclopentadiene having two endomethylene cycles and two double bonds per molecule and mercapto acetic acid, the dihydronortricyclopentadienyl group of said thioether having a double bond in a terminal five-membered cycle and having the thioether group joined to an endoethylene cyclopentano group as the opposite terminal cycle thereof.

9. As a new compound, a dihydronordicyclopentadienyl thioether, the addition-rearrangement product of crystalline dicyclopentadiene and an organic compound having at least one sulfhydryl group, the dihydronordicyclopentadienyl group of said thioether having as one terminal cycle a cyclopenteno group and as the opposite terminal cycle an endoethylene cyclopentano group carrying the thioether group.

10. As a new compound, a dihydronordicyclopentadienyl benzyl thioether, the addition-rearrangement product of crystalline dicyclopentadiene and benzyl mercaptan, the dihydronordicyclopentadienyl group of said thiother having as one terminal cycle a cyclopenteno group and as the opposite terminal cycle an endoethylene cyclopentano group carrying the thioether group.

HERMAN A. BRUSON.
THOMAS W. RIENER.